United States Patent [19]

Lopez

[11] Patent Number: 4,605,817

[45] Date of Patent: Aug. 12, 1986

[54] SAFETY COVER FOR ELECTRICAL OUTLETS

[76] Inventor: Carlos A. Lopez, P.O. Box 391071, Mountain View, Calif. 94039

[21] Appl. No.: 603,673

[22] Filed: Apr. 25, 1984

[51] Int. Cl.[4] .......... H02G 3/18

[52] U.S. Cl. .......... 174/67

[58] Field of Search .......... 174/67; 220/242; 339/36, 39, 44 R, 44 M; D13/30

[56] References Cited

U.S. PATENT DOCUMENTS

| | | | |
|---|---|---|---|
| 2,761,112 | 8/1956 | Torcivia | 174/67 X |
| 2,892,172 | 6/1959 | McGann, Jr. | 174/67 X |
| 2,942,226 | 6/1960 | Low | 174/67 X |
| 4,424,407 | 1/1984 | Barbic | 174/67 |

*Primary Examiner*—Arthur T. Grimley
*Assistant Examiner*—D. A. Tone
*Attorney, Agent, or Firm*—Paul L. Hickman

[57] ABSTRACT

A safety cover for electrical outlet assemblies characterized by a five-sided enclosure adapted to attach over the cover plate of the outlet assembly, and a pair of braces attached within the enclosure to provide support for electric plugs engaged with the sockets of the outlet assembly. The braces and enclosure are provided with slots to permit the passage of the power cords attached to the electric plugs. Each brace is provided with a pair of brackets which help support vertical loads placed upon the braces. Removable platform members are provided to elevate the electric plugs so that they may engage three-prong sockets as well as the more common two-prong sockets.

18 Claims, 5 Drawing Figures

FIG. 1
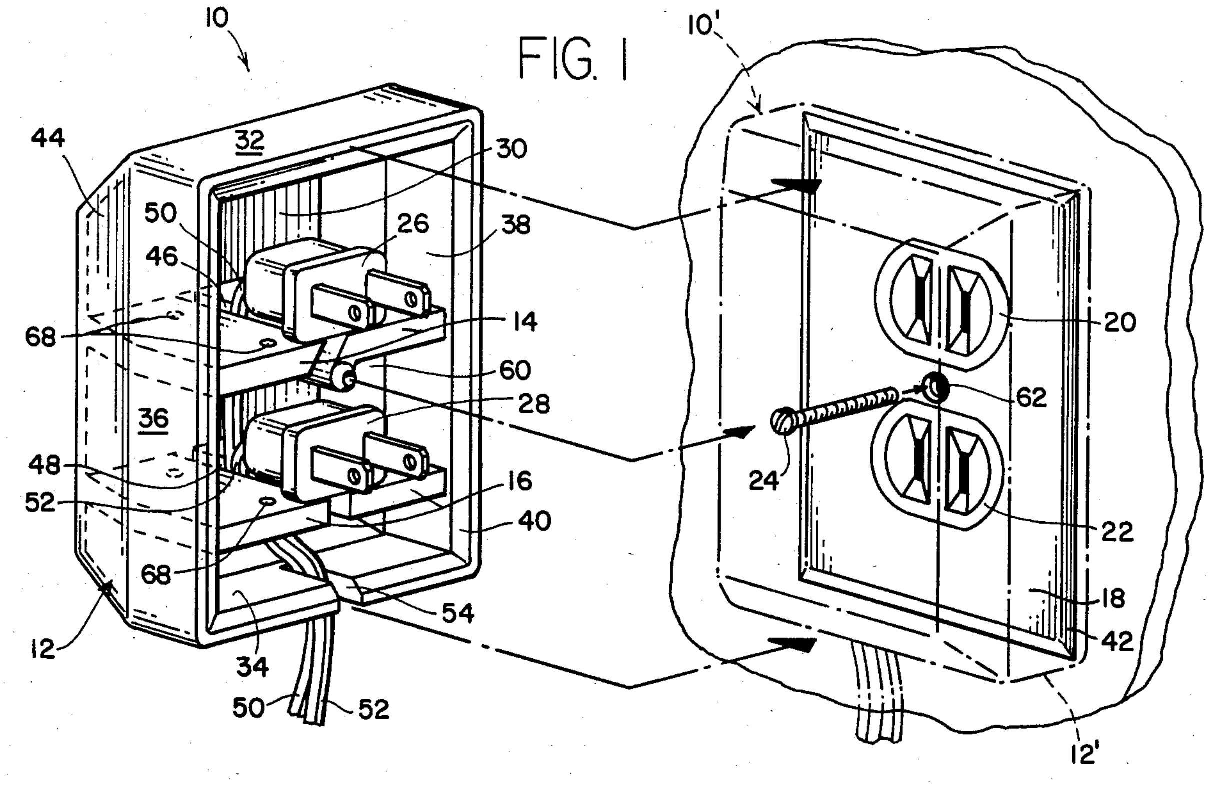
FIG. 2
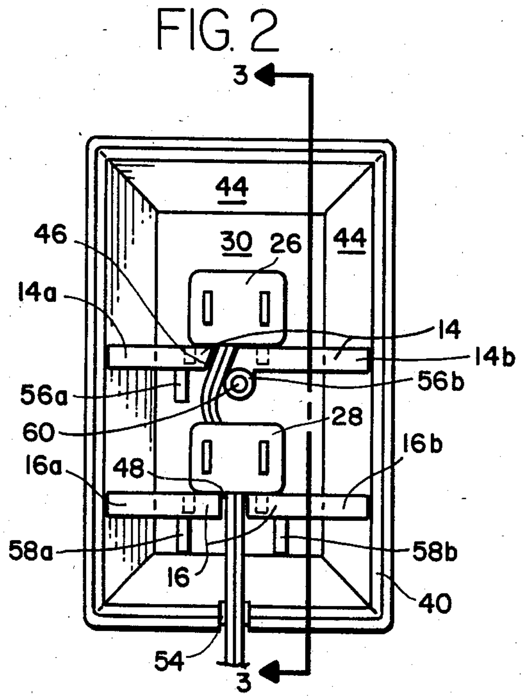
FIG. 3
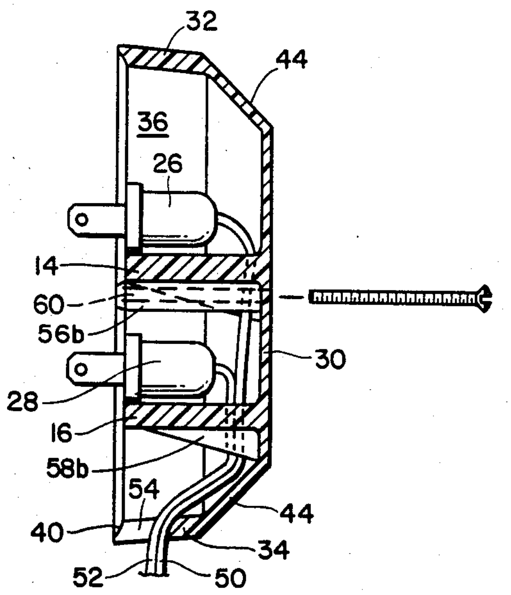
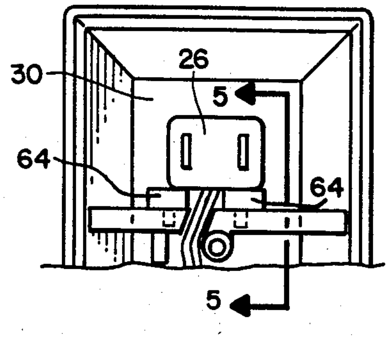
FIG. 4
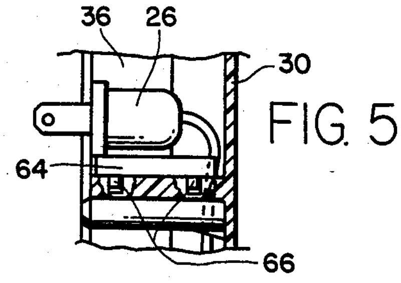
FIG. 5

SAFETY COVER FOR ELECTRICAL OUTLETS

BACKGROUND OF THE INVENTION

1. Field of the Invention

This invention relates to covers for electrical connectors, and more particularly to safety covers which retrofit over standard household A.C. electrical outlet assemblies.

2. Description of the Prior Art

An exposed electric socket is a hazard for small children. If, for example, a child should stick a finger or an electrically conductive object into an electric socket he or she would risk a serious and perhaps even deadly injury. Because of this danger, a number of individuals have designed safety covers which make it more difficult for a child to access electric sockets.

Many patents describe a substantially rectangular cover box which is attached over the cover plate of an electrical outlet assembly. Examples of such boxes can be found in U.S. Pat. Nos. D261,135, 2,415,602, 2,891,102, 2,892,172, 2,987,690, 3,434,618, 3,467,763, 3,491,327, and 4,083,618.

While all of the above referenced cover boxes work well in preventing a child from touching an electric socket, they do not prevent the child from pulling on the power cords and disengaging the electric plugs from the sockets. Consequently, a parent may have to frequently remove and replace the cover box to re-engage the electric plugs with the sockets. Also, the above mentioned cover boxes are subject to breakage as the child attempts to pull the disengaged electric plugs through the walls of the cover boxes.

This problem has been partially solved by providing a support assembly for the electric plugs and/or power cords to prevent them from being pulled from the electric socket. Examples of such cover boxes can be found in U.S. Pat. Nos. 2,942,226 and 3,601,757 which include threaded caps which fit over the electric plugs. Because these prior art cover boxes enclose the electric plug to some degree, they tend to be difficult to install and remove. Furthermore, they are all multi-part assemblies and thus are relatively expensive to manufacture. For example, the plug retainer of U.S. Pat. No. 2,942,226 includes three separate pieces, two of which must be threaded. The plug retainer of U.S. Pat. No. 3,601,757 includes two separate, threaded pieces and requires the electric plugs to be removed separately in a time-consuming process.

Thus, what the prior art fails to disclose is a simple, easy to install, and economical safety cover which prevents the electric plugs from being pulled from the electric sockets.

SUMMARY OF THE INVENTION

An object of this invention is to provide a safety cover for an electrical outlet assembly which is inexpensive, effective, and easy for an adult to install and remove.

Another object of this invention is to provide a safety cover which is of unitary design which prevents an electric plug from being pulled from its socket.

Yet another object of this invention is to provide a safety cover which can be used with either three-prong or two-prong electric outlet assemblies.

Briefly, the invention includes a cover in the shape of a five-sided box, and a pair of support braces attached within the cover. The open side of the cover fits against the cover plate of the electric outlet assembly, and the cover is attached to the outlet assembly with an attachment bolt. The support braces are positioned so as to provide support for the electric plugs engaged with the electric sockets, and are provided with elongated slots to permit the power cords of the electric plugs to pass through. Removable platform members are provided to elevate the electric plugs when they are to be used with three-prong, grounded electric sockets. The braces are preferably provided with brackets which reinforce the braces against vertical loads.

An advantage of this invention is that it is of unitary construction and thus can be produced inexpensively.

Another advantage of this invention is that it prevents the plugs from being pulled from the sockets of the electrical outlet assembly.

Yet another advantage of this invention is that it is easy to install and replace since the braces support but do not surround or enclose the electric plugs and/or power cords.

These and other objects and advantages of the present invention will no doubt become apparent upon a reading of the following descriptions and a study of the several figures of the drawing.

BRIEF DESCRIPTION OF THE DRAWING

FIG. 1 is a perspective view of a safety cover in accordance with the present invention.

FIG. 2 is a rear elevational view of the safety cover of FIG. 1.

FIG. 3 is a cross-sectional view taken along line 3—3 of FIG. 2.

FIG. 4 is a partial rear elevational view of the safety cover with the 3-prong outlet adaptors in place.

FIG. 5 is a cross-sectional view taken along line 5—5 of FIG. 4.

DETAILED DESCRIPTION OF THE PREFERRED EMBODIMENT(S)

Referring to FIGS. 1-3, a safety cover 10 (which is shown in phantom at 10') includes an enclosure 12, and a separated pair of braces 14 and 16. As seen at 10', the safety cover is designed to attach over the cover plate 18 of an electrical outlet assembly having a pair of electric sockets 20 and 22 by means of an attachment bolt 24. When the safety cover is attached over the cover plate 18, electric plugs 26 and 28 are prevented from being pulled from sockets 20 and 22 by braces 14 and 16, respectively.

Enclosure 10 is a hollow, boxy shell having a front wall 30, a top wall 32, a bottom wall 34, and two opposing side walls 36 and 38. The side of enclosure 12 which is opposite front wall 30 is left open, and is provided with a beveled rim 40 which can engage the edge 42 of cover plate 18. While enclosure 10 is shown to have a beveled interface 44 between the front wall 30 and the remaining walls, enclosure 10 can also be made in any suitable shape.

Braces 14 and 16 are provided with elongated slots 46 and 48, respectively, which extend from the opening of enclosure 12 towards front wall 20. Slot 46 permits a power cord 50 of plug 26 to extend through brace 14, and slot 48 permits power cord 50 and a power cord 52 of plug 28 to extend through brace 16. Bottom wall 34 is provided with a shorter slot 54 which permits power cords 50/52 to exit from enclosure 12. As best seen in FIG. 3, the shorter slot 54 serves to hold power cords 50/52 closer to a wall surface.

Slot 46 separates brace 14 into two portions labeled 14*a* and 14*b* in FIG. 2. Slot 48 separates brace 16 into two portions labeled 16*a* and 16*b*. Portions 14*a*/14*b* are supported by brackets 56*a*/56*b*, respectively, and portions 16*a*/16*b* are supported by brackets 58*a*/58*b*. Brackets 56*a*/56*b*/58*a*/58*b* are all connected to front wall 30 and their respective brace portions, and serve to support the brace portions against vertical loads.

While brackets 56*a*/58*a*/58*b* are generally triangular, bracket 56*b* is more cylindrical in shape and is provided with a central bore 60 which extends through front wall 30. Central bore 60 is receptive to bolt 24 and is used to guide the bolt 24 to the threaded bore 62 of the electrical outlet assembly.

In use, the center screw of the electrical outlet assembly is removed, and plugs 26 and 28 are engaged with sockets 20 and 22. Safety cover 10 is then simply placed against the cover plate 18, and screw 24 is passed through bore 60 to engage threaded bore 62. It should be noted that the power cords 50/52, if given a slight downward pull, will almost automatically fall into slots 46, 48, and 54. Thus, the cover 10 is very easy to install and remove, since there are no members which must be made to engage the plugs 26 and 28 and/or the power cords 50/52, as is the case with the aforementioned prior art safety covers.

If a child were to pull upon cords 50/52, the braces 14/16 will prevent them from being pulled from their sockets 20/22. The bracket portions 56*a*/56*b*/58*a*/58*b* are provided to support the braces 14/16 against severe vertical loads, such as if the child were tugging very hard on the cords 50/52.

Braces 14 and 16 are separated such that their upper surfaces will be directly below plugs 26 and 28 when they are engaged with sockets 20 and 22. It should be noted that the sockets 20 and 22 shown in FIG. 1 are of the two-prong or ungrounded type. If plugs 26 and 28 were engaged with three-prong or grounded sockets (not shown in the drawing) they would be separated by a slightly greater distance than they are when they engage two-prong sockets 20/22. To compensate for the greater between three prong sockets, platform members 64 (see FIGS. 4 and 5) can be engaged with brace members 14/16 to slightly elevate the plugs 26/28.

More particularly, platform members 64 are elongated, flat, rectangular members having a pair of pins 66 which engage pairs of holes 68 provided in the bracket portions 56*a*/56*b*/58*a*/58*b*. Slots 46/48 are unencumbered by the platform members 64.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A safety cover for an electrical outlet assembly having a cover plate and a separated pair of sockets extending through said cover plate, said safety cover comprising:

an enclosure provided with an opening adapted to fit over said cover plate;

first brace means located within said enclosure, said first brace means being provided with a first elongated slot extending from said opening of said enclosure towards the interior of said enclosure; and second brace means separated from said first brace means, said second brace means being provided with a second elongated slot extending from said opening of said enclosure towards the interior of said enclosure.

2. A safety cover as recited in claim 1 further comprising first bracket means attached to said enclosure and supporting said first brace means, and second bracket means attached to said enclosure and supporting said second brace means.

3. A safety cover as recited in claim 1 further comprising first removable platform means supportable by an upper surface of said first brace means, and second removable platform means supportable by an upper surface of said second brace means.

4. A safety cover as recited in claim 3 wherein said first brace means and said first removable platform means are provided with first interlocking means, and wherein said second brace means and said second removable platform means are provided with second interlocking means.

5. A safety cover as recited in claim 1 wherein said enclosure is provided with a third slot through a peripheral surface thereof to permit the passage of at least one power cord.

6. A safety cover as recited in claim 1 wherein the rim of said opening of said enclosure is provided with a bevel which matches the contours of said cover plate of said electrical outlet assembly.

7. A safety cover as recited in claim 1 further comprising guide means extending from a front wall portion of said enclosure to said opening of said enclosure, said guide means being provided with a bore receptive to an attachment screw adapted to attach said enclosure to said electrical outlet assembly.

8. A safety cover as recited in claim 7 wherein said guide means is attached to said first brace means.

9. A safety cover as recited in claim 7 wherein said first elongated slot and said second elongated slot each extend substantially all the way from said opening of said enclosure to said front wall portion.

10. A safety cover as recited in claim 7 wherein said third slot extends only partially from said opening of said enclosure to said front wall portion.

11. In an electric outlet assembly including a base unit adapted to mount within a wall, said base unit having a separated pair of electrical sockets each of which is receptive to a plug attached to an end of a power cord, and a cover removably attached to said base unit and adapted to cover said electrical sockets; an improved cover comprising:

a shell adapted to attach over said base unit; and means attached to said shell for supporting said plugs as they engage said electrical sockets including a separated, substantially horizontal pair of braces, each individually attached to an inner wall portion of said shell, where each of said pair of braces is provided with an aperture receptive to said power cords of said plugs, and where each of said pair of braces are provided with at least one support bracket attached to said shell, said support bracket providing support against vertical loads exerted on the brace.

12. An improved cover of the assembly as recited in claim 11 further comprising a mounting screw guide provided with a guide bore and attached to both said shell and one of said pair of braces.

13. An improved cover of the assembly as recited in claim 11 further comprising means for elevating said plugs above the surface of said means attached to said shell.

14. A safety cover for an electrical outlet assembly comprising:

an enclosure having a substantially vertical front wall provided with a screw hole, a substantially horizontal top wall, a substantially horizontal bottom wall opposing said top wall and provided with a power cord slot, and two, opposing, substantially vertical side walls, whereby said enclosure is open on the side opposing said front wall;

a first substantially horizontal brace attached to said two side walls and said front wall, said first brace being provided with an elongated slot which divides said first brace into a first portion and a second portion; and a second substantially horizontal brace attached to said two side walls and said front wall, said second brace being provided with an elongated slot which divides said second brace into a first portion and a second portion;

whereby electric plugs may rest upon said braces as they engage the sockets of said electrical outlet assembly with their attached power cords passing through said slots in said braces and out said power cord slot in said bottom wall.

15. A safety cover as recited in claim 14 wherein the interface between said front wall and said top, bottom, and side walls is beveled.

16. A safety cover as recited in claim 14 wherein each of said first portion and said second portion of both said first brace and said second brace is provided with a bracket means attached to said front wall and supporting said portions for vertical loads.

17. A safety cover as recited in claim 16 wherein one of said bracket means is provided with an elongated bore receptive to a mounting screw which attaches said enclosure to said electrical outlet assembly.

18. A safety cover as recited in claim 17 further comprising platform means attachable to said first brace and said second brace for elevating a plug above the surfaces of said braces.

* * * * *